United States Patent [19]

Kamata

[11] Patent Number: 4,623,227

[45] Date of Patent: Nov. 18, 1986

[54] ZOOM LENS MOUNTING

[75] Inventor: Shigeru Kamata, Tokyo, Japan

[73] Assignee: Canon Kabushiki Kaisha, Tokyo, Japan

[21] Appl. No.: 410,882

[22] Filed: Aug. 24, 1982

[30] Foreign Application Priority Data

Sep. 2, 1981 [JP] Japan ............... 56-138150

[51] Int. Cl.[4] .................................. G02B 15/00
[52] U.S. Cl. ................................. 350/430
[58] Field of Search ............... 350/430, 429, 255

[56] References Cited

U.S. PATENT DOCUMENTS

| 3,841,735 | 10/1974 | Katagiri et al. | 350/430 |
|---|---|---|---|
| 4,045,128 | 8/1977 | Momiyama | 350/255 |
| 4,101,202 | 7/1978 | Tesch | 350/430 |
| 4,210,387 | 7/1980 | Ogawa | |
| 4,346,967 | 8/1982 | Komoto et al. | 350/430 |
| 4,456,342 | 6/1984 | Muryoi | 350/430 |

*Primary Examiner*—John K. Corbin
*Assistant Examiner*—P. M. Dzierzynski
*Attorney, Agent, or Firm*—Toren, McGeady, Stanger, Goldberg & Kiel

[57] ABSTRACT

A zoom lens mounting capable of focusing beyond the usual range of object distances towards close ups in a particular region of the zooming range has a control member which changes its position depending upon the relative position of a focusing actuator to a zoom control cam member or vice versa, wherein the aforesaid focusing actuator and the aforesaid cam member are each provided with an area subject to constraint with the aforesaid control member and an area not subject to the constraint.

1 Claim, 12 Drawing Figures

ZOOM LENS MOUNTING

BACKGROUND OF THE INVENTION

1. Field of the Invention

This invention relates to a mechanical mounting for a zoom lens, and more particularly to a mounting for a zoom lens capable of closeup photoraphy beyond the usual focusing range.

In FIGS. 1a and 1b, lens I represents a focusing lens movable along an optical axis 01-02 by rotative operation of a focusing actuator about the optical axis, and lenses II and III represent a zooming lens system movable along the optical axis 01-02 to effect variation of image magnification and image shift compensation by rotative or linear operation of a zooming actuator about or along the optical axis 01-02. Dashed lines, x and y, indicate traces of movement of the variator II and compensator III.

Figure 1:
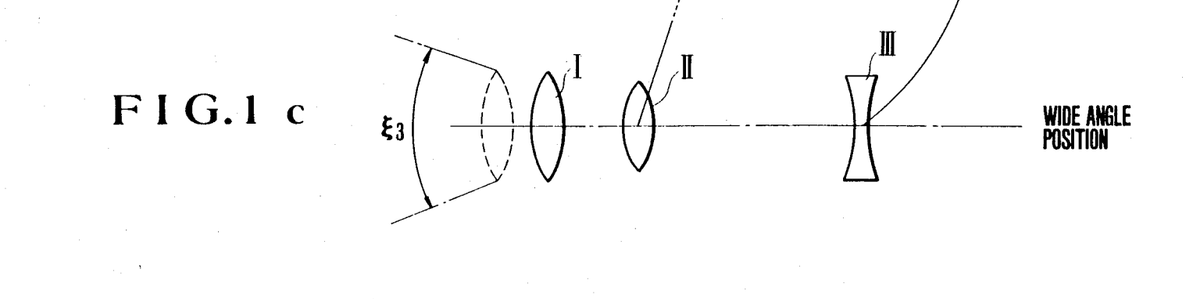
FIGS. 1a, 1b, and 1c are schematic views illustrating different image angles of a zoom lens in relation to the telephoto, middle and wide angle positions of the various components thereof.
FIG. 1d is a graph explaining the manner in which the prior art mounting mechanism operates.

FIG. 1a illustrates the various lens components with the zooming actuator set in the telephoto position in which the focusing lens component I is rendered movable towards an object to be photographed until closeup photography from a distance, for example, 0.8 meters becomes possible. When in the wide angle position of FIG. 1c, the focusing lens component I can be closed to 1.0 meter, whereby the image angle of the focusing component I is widened from $\epsilon_1$ through $\epsilon_2$ to $\epsilon_3$ as the focal length of the entire system changes from the longest through the middle to the shortest focal length, as illustrated in FIG. 1.

Therefore, in order to accomplish closeup photography by axially moving the focusing component beyond the usual focusing component and beyond the usual focusing range towards closer object distances without introducing some vignetting, total movement of the lens components II and III contributing to the zooming action must be limited to a shortened range.

2. Description of the Prior Art

Prior art in the field of the invention includes U.S. Pat. No. 4,210,387.

In U.S. Pat. No. 4,210,387, focusing beyond the usual range of object distances towards shorter ones in particular focal length settings, the mounting mechanism is characterized by the following feature:

A stopper member is either in fixedly secured relation to, or in differential relation to, the zooming control member to define the forward range movement limit of the focusing control member.

Figure 1D:
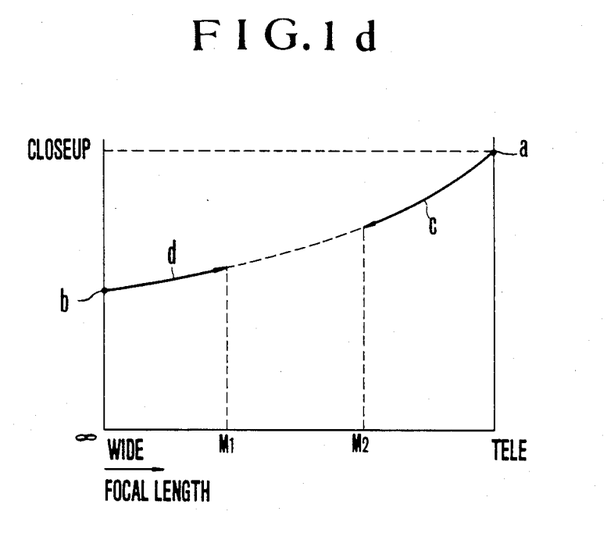

In the zoom lens mounting mechanism of this construction, the following phenomenon takes place. Referring to FIG. 1d, there is shown a graph where the abscissa is in the position of the zoom control member with variation of the focal length of the entire system. The ordinate is in the position of the focusing control member with variation of the object distance, and where a point, a, indicates the closest object distance possible beyond the usual focusing range when in the telephoto setting, and another point, b, indicates the shortest focusable object distance when in the wide angle setting, being shiftable depending upon the focal length position.

The mounting mechanism of U.S. Pat. No. 4,210,387 operates in such a manner that, assuming that the variator sleeve member 5 is first set at the aforesaid point, a, then when it moves towards the wide angle side to change the focal length, the focusing member 1 follows up through the stopper 10, while the closest possible object distance is changed along a curved line, c, in FIG. 1d.

Alternatively assuming that the variator sleeve member 5 lines upon the aforesaid point, b, then when the focusing member 1 moves to effect focusing from a shorter object distance to the closest, the variator sleeve member 5 changes the focal length along a curved line, d, in FIG. 1d.

In conclusion, the mounting mechanism of U.S. Pat. No. 4,210,387 has the disadvantage that the focusing member is shifted, during zooming or that the variator sleeve member is shifted during focusing.

An object of the present invention is to provide a mechanical mounting for a zoom lens with a focusing actuator movable beyond the usual focusing range to closer object distances to effect closeup shooting, wherein when the focusing actuator is in the closeup range, the range of movement of the zooming control member is readjusted depending upon the position of the focusing actuator, whereby the maximum possible image angle can be adjusted in accordance with the object distance.

Another object of the present invention is to provide a mechanical mounting which has solved the above-described problem without making the structure complicated and minimizing the number of constituent parts.

SUMMARY OF THE INVENTION

To accomplish the aforesaid object, the mounting mechanism is a simple structure with little increase in the number of moving parts. The present invention contemplates the use of the main constituent parts of a zoom lens mounting which have generally been employed in the prior art, namely, the body tube, the cam sleeve member movably fitted to the body tube to control the axial movement of the zooming lenses II and III, and the focusing control member movably fitted to the aforesaid body tube to control the movement of the focusing lens I, in combination with a member, upon setting of the focusing control member in the closeup range to limit the range, of movement of the aforesaid cam sleeve member to prevent mutilation of the light rays emerging from the focusing lens I by the edges of the zooming lenses II and III, or to avoid vignetting.

BRIEF DESCRIPTION OF THE DRAWINGS

FIG. 3 is a cross-sectional view taken along line A1-A2 of FIG. 2 illustrating what focusing and zooming ranges are limited depending upon the relative positions of the zooming and focusing control members to each other and to the body tube.

DESCRIPTION OF THE PREFERRED EMBODIMENT

The present invention will next be described in conjunction with an embodiment thereof by reference to FIGS. 2 and 3a to 3g.

Figure 2:
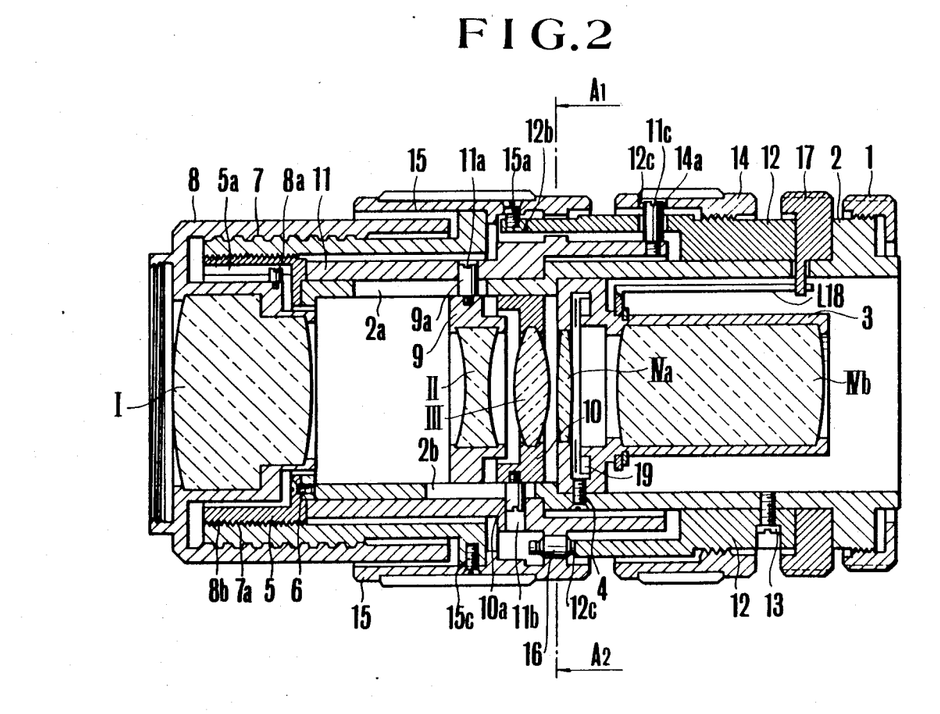
FIG. 2 is an axial section view of an embodiment of a zoom lens mounting mechanism according to the present invention.

In FIG. 2, reference numeral 1 identifies a tightening ring such as a bayonet mount ring, or a screw mount ring for coupling with a camera body (not shown). A body tube 2 movably carries the aforesaid coupling ring 1 at the rear end thereof and contains a lens holder 3 for a relay lens group IVa and IVb in fixedly secured relation thereto by a screw fastener 4. This body tube 2 has axially elongated linear guide slots 2a and 2b intermediate the length thereof and has a screw-threaded ring 5 which meshes with an inner screw-threaded portion of a rotary helicoid sleeve 7 and which is fixedly secured thereto by a screw fastener 6 at the front end.

In the inner periphery of the screw-threaded ring 5 is an axial guide groove 5a. A 1st lens barrel 8 holding a focusing lens group I has a helicoid screw 8b meshing with a threaded portion 7a of the rotary helicoid sleeve 7, and fixedly carries a pin 8a radially extending into the guide groove 5a of the aforesaid ring 5. Two movable lens cells 9 and 10 holding the 2nd and 3rd lens groups II and III, which contribute to zooming, are in the interior of the body tube 2. Cam follower pins 9a and 10a are fixed to the respective lens cells 9 and 10. A cam sleeve 11 is rotatably fitted on the outer diameter of the body tube 2 while being restrained from axial movement, and has camming grooves 11a and 11b for controlling the movement of the aforesaid zoom lens groups II and III. These camming grooves 11a and 11b receive the aforesaid pins 9a and 10a projected outward from the aforesaid guide slots 2a and 2b. A drive connection pin 11c is fixed to the rear portion of the cam sleeve 11. A 2nd body tube 12 is fixedly secured to the 1st body tube 2 by a screw fastener 13 and has a screw-threaded portion in the outer periphery thereof which meshes with a zooming actuator 14. The zooming actuator 14 has a longitudinal groove 14a into which the aforesaid drive connection pin 11c extends after having passed through a circumferential slot 12a in the 2nd body tube 12. A focusing actuator 15 is fixed to the aforesaid rotary helicoid sleeve 7 as a unit by a screw fastener 15c, and fixedly carries a focus stopper screw 15a. An abutment 12b for the focus stopper 15a is positioned in front of the 2nd body tube 12. A control member 16 is fitted into a hole 12c provided into the 2nd body tube 12. This control member 16 functions as a stopper member for readjusting the focusing or zooming range depending upon the angular position of the focusing actuator 15 or cam sleeve 11, as will be more fully explained later. A diaphragm presetting ring 17 is rotatably fitted on the 1st body tube 2 and is operatively connected by a signal transmission member 18 to a diaphragm unit 19 of known construction.

FIGS. 3a to 3f, in a cross-sectional view taken along line A1-A2 of FIG. 2, illustrate the spatial relationship of the main constituent parts of the mechanical mounting of FIG. 2, namely, the cam sleeve 11, 2nd body tube 12 and focusing actuator 15. And it is clarified that the aforesaid cam sleeve 11 and the aforesaid focusing actuator 15, respectively rotatably fitted on the inner and outer diameters of the 2nd body tube 2, are provided with radially recessed portions 11e and 15d in the outer surface of the cam sleeve 11 and the inner surface of the focusing autuator 15 at a location in which the aforesaid control member 16 in the 2nd body tube 12 even when moved radially inwardly allows the cam sleeve 11 to turn about the optical axis in a certain range, and even when moved radially outward allows the focusing actuator 15 to turn about the optical axis in a certain range. These recessed portions may otherwise be areas not subject to constraint by the control member 16.

Figure 3A:
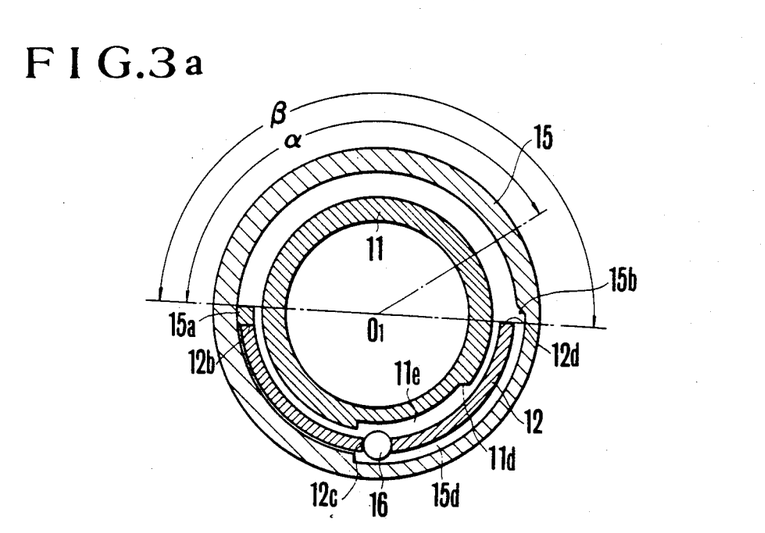
FIG. 3a illustrates the telephoto setting with an object at infinity.

FIG. 3a illustrates an operative position for the longest focal length and an infinitely distant object where the focus stopper 15a is in contact with one of the abutments 12b, which represents the rearward limit of the usual focusing range so that further counter-clockwise movement is inhibited.

Figure 3B:
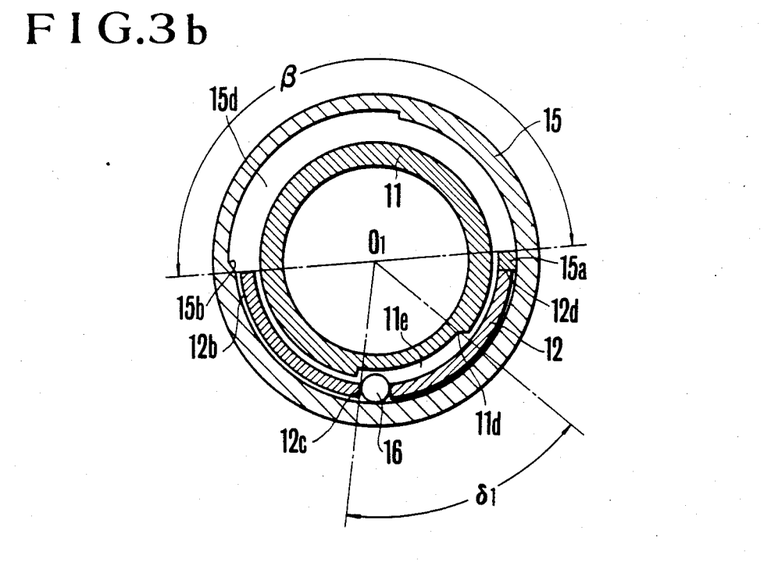
FIG. 3b illustrates the telephoto setting with an object at the closest position.

FIG. 3b illustrates another operative position obtained by turning the focusing actuator 15 clockwise from the position of FIG. 3a to effect focusing on an object at the closest range possible, while leaving the cam sleeve 11 unchanged from the telephoto position, wherein the focus stopper 15a is in contact with the opposite abutment which represents the forward limit of the closeup focusing range. At this time, the control member 16 is moved radially inward moved by the shoulder 15b extending from the bottom of the recessed portion 15d to the inner surface of the focusing actuator sleeve 15.

As the focusing actuator 15 turns from the position of FIG. 3a to the position of FIG. 3b, the rotary helicoid sleeve 7 also turns therewith, while such rotative movement being transmitted by the pin 8a-and-guide groove 5a connection axially moves the 1st lens barrel 8.

It should be pointed out that with the zooming actuator in the telephoto position as illustrated in FIGS. 3a and 3b, the focusing actuator 15 turns beyond an angle of rotation, $\alpha$, representing a usual focusing range (for example, from infinity to 0.8 meters), up to an extended angle, $\beta$.

Figure 3C:
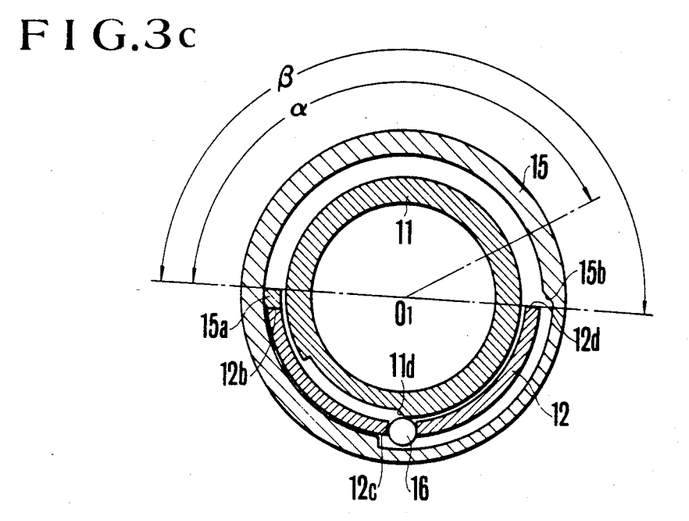
FIG. 3c illustrates an intermediate zooming position with an object at infinity.

FIG. 3c illustrates an intermediate focal length position as attained from the telephoto position of FIG. 3a by turning the zooming actuator 14 clockwise, while the focusing actuator is stationary in the infinitely focusing position. Rotative movement of the zooming actuator 14 of FIG. 2 is transmitted through the drive connection pin 11c to the cam sleeve 11 whose rotative movement is then transmitted to axially move the lens groups II and III in differential relation to each other. When the intermediate focal length position is reached, the control member 16 is moved radially outward from of the hole 12c of the 2nd body tube by a shoulder 11d extending from the bottom of the recessed portion 11e to the outer surface of the cam sleeve 11.

Figure 3D:
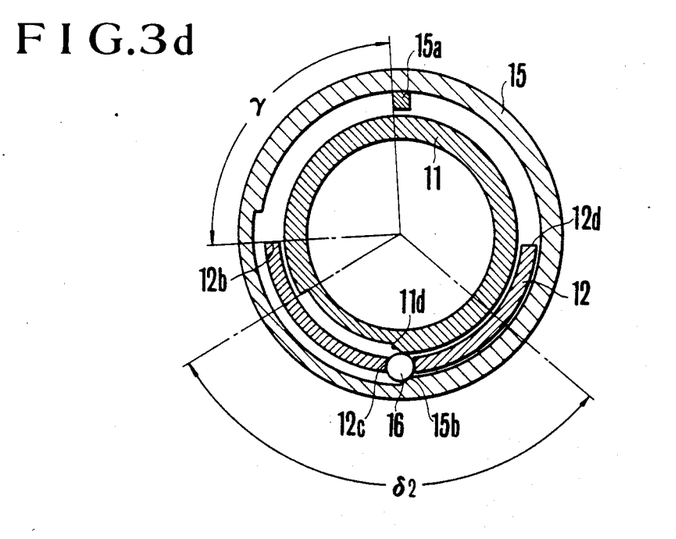
FIG. 3d illustrates the intermediate zooming position with the focusing member at the clockwise movement limit thereof.

FIG. 3d illustrates the limitation of the angle of rotation of the focusing actuator 15 to a value, $\gamma$, by the control member 16 constraining with the shoulder 15b of the focusing actuator 15, since the control member 16 projects outward when the zooming actuator assumes the intermediate position. Therefore, the forward limit of the focusing range is shifted to a longer object distance.

Figure 3E:
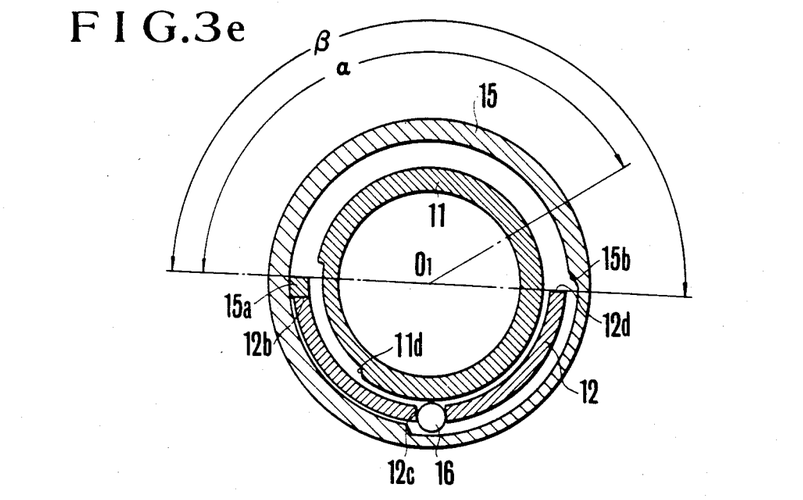
FIG. 3e illustrates the wide angle position with an object at infinity.

FIG. 3e illustrates further a different operative position for the shortest focal length and focusing at infinity where the focus stopper 15a is in contact with the 1st abutment 12b, and as the control member 16 projects outward, the allowable focusing range is narrowed.

Figure 3F:
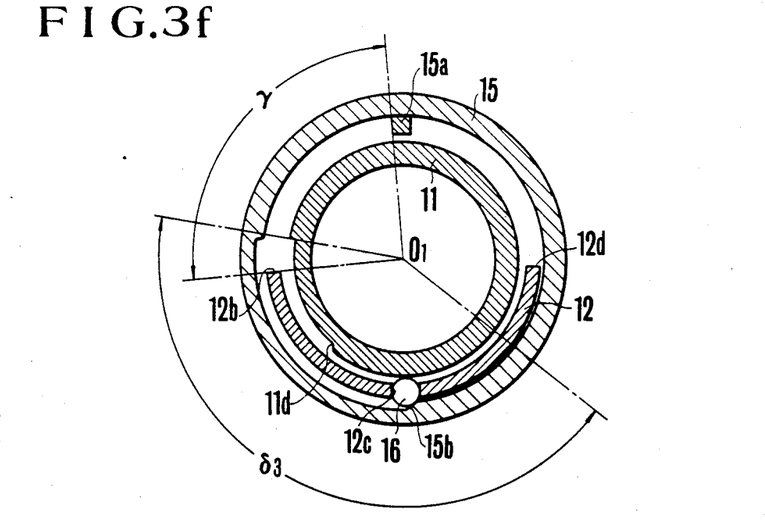
FIG. 3f illustrates the wide angle position with the focusing member at the clockwise movement limit thereof.

FIG. 3f illustrates a mechanical interference between the control member 16 and the shoulder 15d of the focusing actuator 15 as the focusing actuator 15 is turned clockwise to change focusing to shorter object distances, thereby closeup photography is rendered impossible.

Turning again to FIG. 3b, with the focusing actuator 15 preset for an object at infinity, when the zooming actuator 14 in turned clockwise from the telephoto position, the shoulder 11d of the cam sleeve 11 is in constraining engagement with the control member 16, as the control member 16 is projected inward by the shoulder 15b of the focusing actuator, thereby the zooming range is narrow.

In the lens mounting mechanism of the construction illustrated in FIGS. 2 and 3, as long as the focusing lens I operates within the usual focusing range (or the focusing actuator is to within the angle, $\alpha$, indicated in FIGS. 3a, 3c and 3e), the zooming actuator 14 operates the cam sleeve 11 throughout the entire available zooming range defined by the angle of rotatio, $\delta3$, so that the zoom lens groups II and III become moveble from the telephoto to the wide angle position.

Figure 3G:
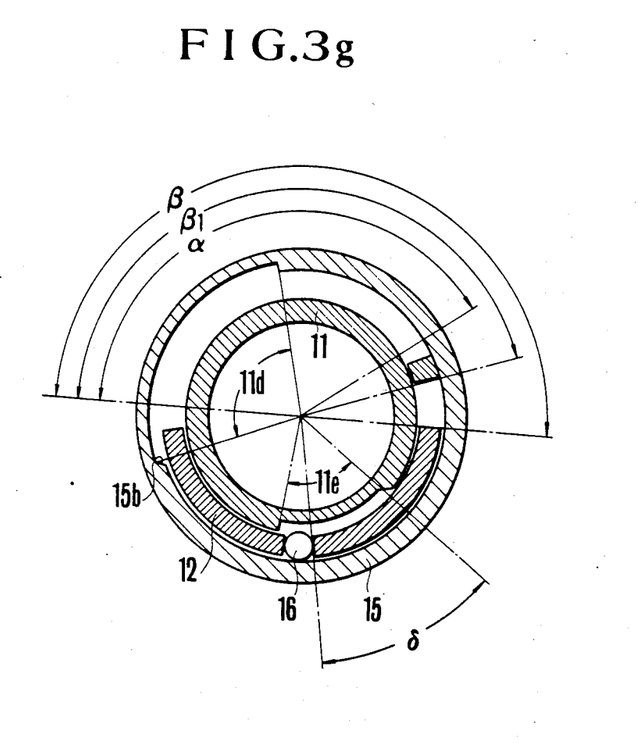
FIG. 3g illustrates a range of movement of the zooming control member which takes place when the focusing control member is preset in a closeup range ($\beta$-$\alpha$) beyond the usual focusing range $\alpha$.

Next, the focusing actuator 15 is turned from the position of FIG. 3a into the closeup focusing range, as illustrated in FIG. 3g. The allowed range of movement of the focusing actuator 15 towards the closeup focusing range is that as the control member 16 is projected radially outward by the shoulder 11d at one end of the thinned portion 11e of the cam sleeve 11, the focusing actuator 15 is stopped from further clockwise movement by the shoulder 15b at one end of the thinned portion 15d of the focusing actuator 15.

Therefore, as illustrated in FIG. 3g, when the focusing actuator 15 is set in the closeup focusing range, the cam sleeve 11 rotation range responsive to the action of the zooming actuator 14 is restricted to narrow limits defined by the angle, $\delta$.

That is, when the focusing actuator 15 is set in the closeup range, the control member 16 is pushed radially outward by the ramping slope 15b of the thinned portion, thereby restricting the range of rotation of the cam sleeve member 11 to narrow limits depending upon the set position of the focusing actuator 15 which makes it possible to perform zooming, thus preventing the rays of light incident upon the zooming lens from being mutilated which would otherwise occur when the zoom lens groups II and III are moved to a distance greater in closeup photography.

In particular, the present invention positions the cam sleeve 11 and the focusing actuator 15 on either radial side of the body tube 12 with areas subjected and not subjected to constraint with the control member 16 being in the outer or inner surface of the cam sleeve 11 and focusing actuator sleeve 15. The control member 16 in the body tube 12 is in freely movable relation thereto for restricting the ranges of rotation of the aforesaid cam sleeve 11 and the focusing actuator sleeve 15 to narrower limits. Thereby it is possible to obtain a mechanical mounting for a zoom with these advantages without a particular increase in the complexity of the structure as compared with the conventional zoom lens mounting.

What I claim:

1. A zoom lens mounting, comprising:

a fixed barrel;

focusing means having a focus lens, a focus lens holder, and a focusing actuator member, said focusing actuator member being mounted on the outside of said fixed barrel, and said focus lens being moved along the optical axis by operation of said focusing actuator member;

zooming means having a zoom lens, a zoom lens holder, a zooming actuator member and a cam member inserted in the inside of said fixed barrel, said cam member being rotated by operation of said zooming actuator member to move said zoom lens along the optical axis to perform zooming; and means for changing the range of movement of said focusing actuator member depending upon the position of said zooming actuator member;

said changing means comprising:

recesses provided respectively at the outer periphery of said cam member and at the inner periphery of said focusing actuator member;

a control member which is held in a hole which is perforated through said fixed barrel in such a way as to move along the radial direction of the lens axis by means of said cam member or said focusing actuator member;

wherein said control member is moved along said radial direction corresponding to the focal length set by said zooming actuator member, thus limiting the amount of rotation of said focusing control member.

* * * * *